United States Patent [19]

Gustavsson

[11] 3,852,040

[45] *Dec. 3, 1974

[54] APPARATUS FOR REMOVING UNDESIRABLE SUBSTANCES FROM FLUE GAS OR THE LIKE

[75] Inventor: Karl Axel Göran Gustavsson, Enkoping, Sweden

[73] Assignee: Aktiebolaget Bahco Ventilation, Enkoping, Sweden

[ * ] Notice: The portion of the term of this patent subsequent to May 8, 1990, has been disclaimed.

[22] Filed: May 30, 1972

[21] Appl. No.: 257,889

[52] U.S. Cl........................... 23/284, 55/228, 55/248, 423/242
[51] Int. Cl........................... B01d 47/02, B01j 1/00
[58] Field of Search ............. 23/284, 283, 285, 260, 23/252 R; 55/227, 228, 229, 248, 249, 230, 236; 261/119 R; 423/242

[56] References Cited

UNITED STATES PATENTS

| | | | |
|---|---|---|---|
| 3,190,729 | 6/1965 | Emmett et al. | 23/285 X |
| 3,522,004 | 7/1970 | Lopker | 23/285 X |
| 3,608,281 | 9/1971 | Gustavsson | 55/228 |
| 3,731,811 | 5/1973 | Gustavsson | 210/194 |

*Primary Examiner*—Joseph Scovronek
*Attorney, Agent, or Firm*—Stevens, Davis, Miller & Mosher

[57] ABSTRACT

An apparatus for removing sulfur dioxide and other polluting substances from a gas which is to be vented to the atmosphere is provided with a means for recycling a slurry used to react with sulfur dioxide or other substance at a controlled consistency which comprises a means responsive to the pressure of the pump recycling the slurry for directing the flow of slurry to a settling tank or directly back to the treatment tank.

2 Claims, 1 Drawing Figure

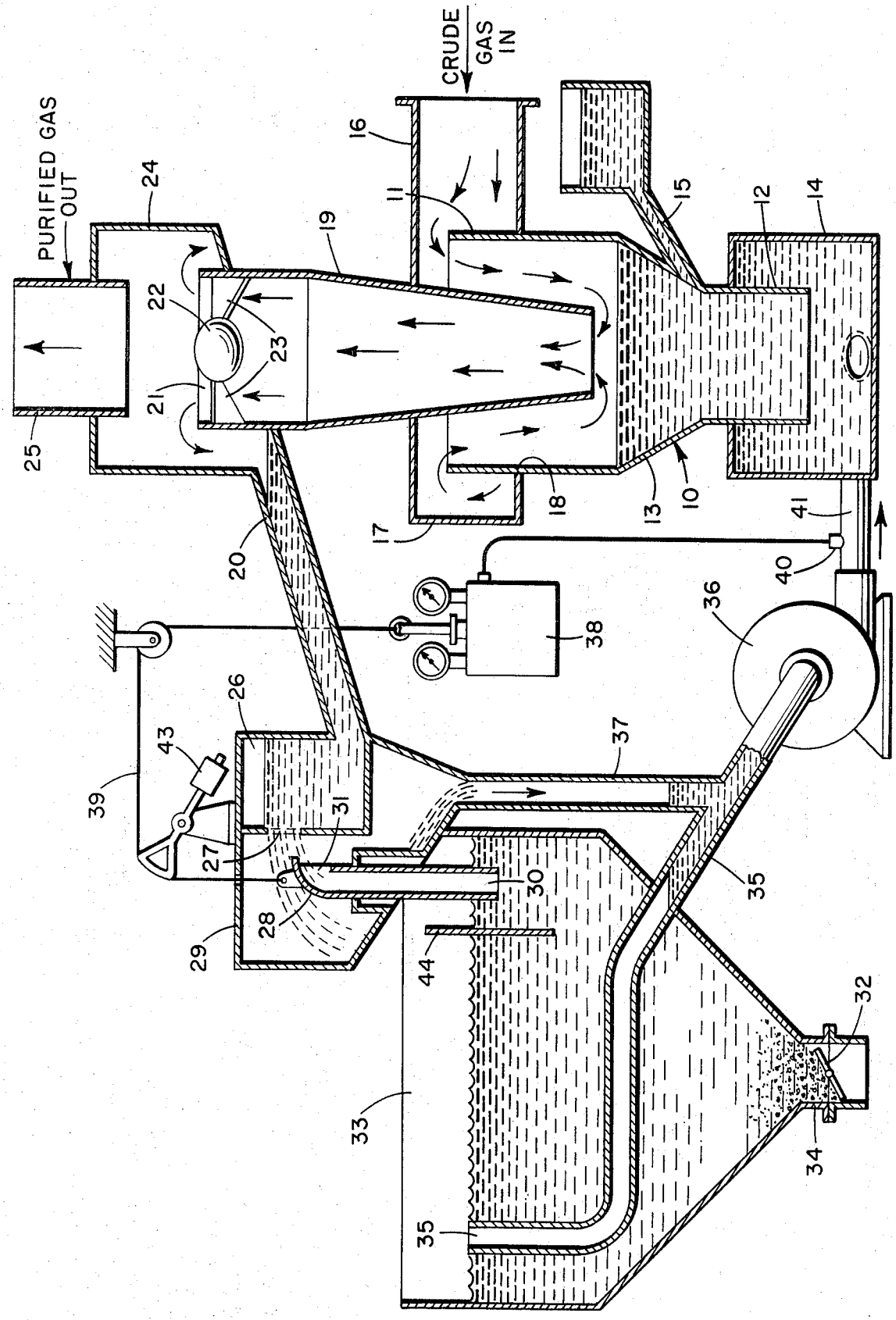

APPARATUS FOR REMOVING UNDESIRABLE SUBSTANCES FROM FLUE GAS OR THE LIKE

This invention relates generally to an apparatus and method for removing pollutants from a gas and more particularly to an apparatus and method for removing sulfur dioxide from a gas before it is vented to the atmosphere.

Flue gases from burning coal, oil or similar fuel and waste gases from various industrial plants often contain substances which pollute the air of the surrounding atmosphere. Such gases frequently contain sulfur dioxide as well as soot and other solids which may cause corrosion, poisoning of vegetation or produce smog.

An apparatus for removing sulfur dioxide from a gas is disclosed in U.S. Pat. No. 3,608,281. The disclosed apparatus combines a treatment tank containing a solution or suspension of a substance which will react with sulfur dioxide to form a solid, means for flowing a gas containing sulfur dioxide at a high velocity perpendicularly against the surface of the solution or suspension to entrain liquid containing the neutralizing substance, means for flowing the gas and entrained liquid at a reduced velocity, means for separating the entrained liquids and solids suspended therein from the gas and a means for separating the solids from the liquid and for returning the liquid to the treatment tank. Such an apparatus has many advantages but does not provide for separation of solids from less than all of the slurry recovered from the gas treatment step even though the slurry may have a consistency which would permit its recycling without passing through a sedimentation tank.

It is therefore an object of this invention to provide an improved apparatus and method for removing obnoxious materials from a gas. Another object of the invention is to provide an improved apparatus and method for removing sulfur dioxide from a gas. Still another object of the invention is to provide an improved means for recycling a liquid used to remove sulfur dioxide or the like from a gas. A still further object of the invention is to provide in an apparatus for removing sulfur dioxide or the like from a flue gas an improved means for separating a slurry according to its consistency into a stream to be separated from solid before recycling and into a stream to be recycled without separating solid therefrom.

Other objects will become apparent from the following description with reference to the accompanying drawing in which:

The FIGURE illustrates diagrammatically one embodiment of the apparatus provided by this invention.

Referring now to the drawing, a tank 10 has an upper cylindrical section 11 with an open top, a lower cylindrical section 12 having an open bottom and an integral intermediate frusto-conical section 13. The lower open end of section 12 is supported in a sludge mill 14 provided with rotating grinding balls. Inlet pipe 15 is attached to a suitable make-up tank where fresh water is mixed with lime or other reactive or absorbent material for the undesirable material to be removed from a gas before it passes to the atmosphere. Inlet pipe 15 is connected to an opening in the wall of section 13.

A conduit 16 having a closed end 17 and an opposite open end connected to a source of gas to be purified has an opening 18 in one side thereof. The upper open end of section 11 extends through the opening 18.

A scrubbing column 19 is disposed above tank 10 with its lower frusto-conical section extending downwardly into section 11. The open bottom of column 19 is just above the point where sections 11 and 13 meet. The upper end of column 19 is cylindrical and has a top with an opening 21 therein for passage of fluids therethrough. A guide vane unit 22 is mounted in opening 21 with guiding vanes 23.

A droplet separator 24 has a bottom forming a fluid impervious seal about the cylindrical section of column 19. A stack 25 for carrying gas from the apparatus has its lower open end fixedly secured in an opening in the top of separator 24.

A conduit 20 is connected at one end to the bottom of separator 24 and at the other end to a tank 26. An opening 27 in one wall of tank 26 permits liquid to flow into a collector tank 29. A conduit member 30 extends into tank 29 and is movable vertically through a fluid impervious seal. The upper end of member 30 has an arcuate shaped top which projects outwardly as a diverter tongue 28 towards opening 27 and above an opening 31 in the sidewall of member 30. Opening 31 is adapted to intercept liquid flowing through opening 27 into tank 29.

The lower open end of member 31 extends into a settling tank 33. A sludge outlet 34 is provided in the bottom of tank 33 and the lower portion of tank 33 is preferably conical to encourage flow of sludge from tank 33 when a valve 32 in outlet 34 is open. A decanting conduit 35 has an open end spaced below the top of tank 33 and extends through an opening in the wall of tank 33 to a pump 36. A drain pipe 37 in the bottom of tank 29 is connected to conduit 35 between tank 33 and pump 36. Baffle 44 encourages flow of slurry towards the bottom of tank 33 and away from conduit 35.

A pressure responsive means 38 actuates a motor which moves cable 39 in response to pressure change detected by pressure sensing device 40 in conduit 41 between pump 36 and sludge mill 14. Conduit 41 enters the bottom of mill 14 through a tangential inlet. Actuation of cable 39 moves member 30 up or down to determine the relative volumes of slurry passing into tank 29 and tank 33.

In operation for the removal of sulfur dioxide, tank 10 is charged with a volume of liquid containing lime. The upper surface of the liquid is just below the open bottom of column 19. Gas flows through conduit 16, downwardly substantially uniformly through section 11 of tank 10 and impinges upon the surface of the liquid substantially perpendicularly thereto. The level of liquid is maintained by supplementing the volume of liquid returned by pump 36 with fresh liquid through inlet 15. Inlet conduit 15 may be connected to apparatus of the kind described in U.S. Pat. Nos. 3,608,281 or 3,640,053 to replace liquid which evaporates or is otherwise lost from the system. Gas flowing from conduit 16 strikes the exposed surface of the liquid in tank 10 at a high velocity and carries drops of liquid into scrubber 19. The velocity of the gas is reduced as it flows upwardly through scrubber 19 which gradually increases in cross section and volume from bottom to top. This provides sufficient contact time for the sulfur dioxide to react with calcium hydroxide in the liquid carried by the gas. Scrubber 19 is filled with drops of liquid from tank 10 during operation by maintaining the liquid level in tank 10 just below the open end of scrubber 19 and by maintaining the gas velocity at the point of entrainment and reducing the velocity as the gas flows through scrubber 19.

Any solids carried into the system with the gas and solids entrained by the gas and formed by chemical reaction with the sulfur dioxide are carried away through conduit 20 with the liquid separated from the gas in separator 24. The purified gas passes upwardly through stack 25.

The slurry carried by sloping conduit 20 to accumulator tank 26 overflows through opening 27. The stream of slurry emerging from opening 27 is diverted by tongue 28 into two streams with one stream passing through conduit 37 and the other into sedimentation tank 33. A volume of supernatant liquid equal to the volume of slurry passing through member 30 is pumped through conduit 35 along with slurry from conduit 37 to sludge mill 14 by mill pump 36.

The volumes of the two streams of slurry passing through conduit 37 and member 30 are determined by the height of diverter tongue 28. The height of tongue 28 is determined by the consistency of the slurry in conduit 41 by measuring the pump pressure. As the consistency of the slurry increases, the pump pressure increases. A pressure responsive device 38 raises member 30 with pressure increase and permits it to be lowered by counter-weight 43 when the pressure drops. The pressure responsive regulating device can be adjusted to provide an optimum constant slurry consistency in pipe 41.

The level in tank 26 should be maintained substantially constant in order to avoid fluctuations in slurry flow. This is achieved by providing opening 27 in the side of the divider in tank 26.

While lime is used in the foregoing embodiment for neutralizing sulfur dioxide, other suitable alkaline materials such as limestone, an alkali metal hydroxide or carbonate such as sodium hydroxide, sodium carbonate, potassium hydroxide, calcium hydroxide or potassium carbonate may be used.

The only waste product is the sludge formed by consumed alkali, solid constituents of the gas and sulfur compounds formed by reaction of sulfur dioxide washed from the flue gas. The apparatus may include more than one treatment tank, scrubber and droplet separator if more than one such assembly is required to remove all of the undesirable materials from the gas.

Although the invention has been described in detail for the purpose of illustration, it is to be understood that such detail is solely for that purpose and that variations can be made by those skilled in the art without departing from the spirit and scope of the invention except as it may be limited by the claims.

I claim:

1. An apparatus for removing pollutants from a gas comprising tank means for a treatment liquid, means for flowing the gas substantially perpendicularly against the surface of the treatment liquid and entraining liquid in the gas, means for flowing the gas upwardly and for reducing its velocity, means for separating liquid and solids carried thereby from the gas, means for flowing the resulting slurry as a stream, and means for dividing the said stream into two sub-streams comprising a conduit for intercepting less than all of the said stream and for carrying the resulting intercepted sub-stream to a settling tank, means for carrying the remaining sub-stream to a means for pumping supernatant liquid from the said settling tank and the said remaining sub-stream to the treatment tank, and means responsive to the pump pressure for positioning the said intercepting conduit with respect to the said means for flowing the slurry as a stream thereby determining the volumes of the said sub-streams.

2. The apparatus of claim 1 wherein the said means for dividing the said stream of slurry comprises a tank, an overflow opening in a wall of the tank, said intercepting conduit having an open end disposed in spaced relationship with the overflow opening and adapted to be moved relative to the overflow opening to determine the proportion of slurry stream flowing through the opening which is intercepted thereby, and means for moving the capture conduit responsive to the pressure of the said pump.

* * * * *